Dec. 24, 1957     H. W. SCHWENGEL     2,817,508
APPARATUS FOR MELTING IRON IN A CUPOLA

Filed April 1, 1952     2 Sheets-Sheet 1

INVENTOR.
Harold W. Schwengel
BY
Morsell & Morsell
ATTORNEYS.

Dec. 24, 1957  H. W. SCHWENGEL  2,817,508
APPARATUS FOR MELTING IRON IN A CUPOLA
Filed April 1, 1952  2 Sheets-Sheet 2
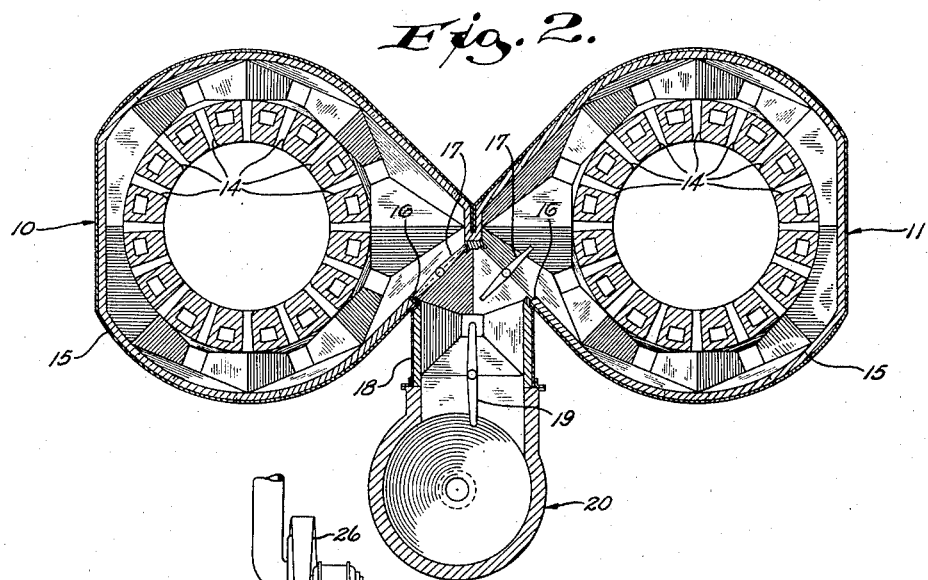
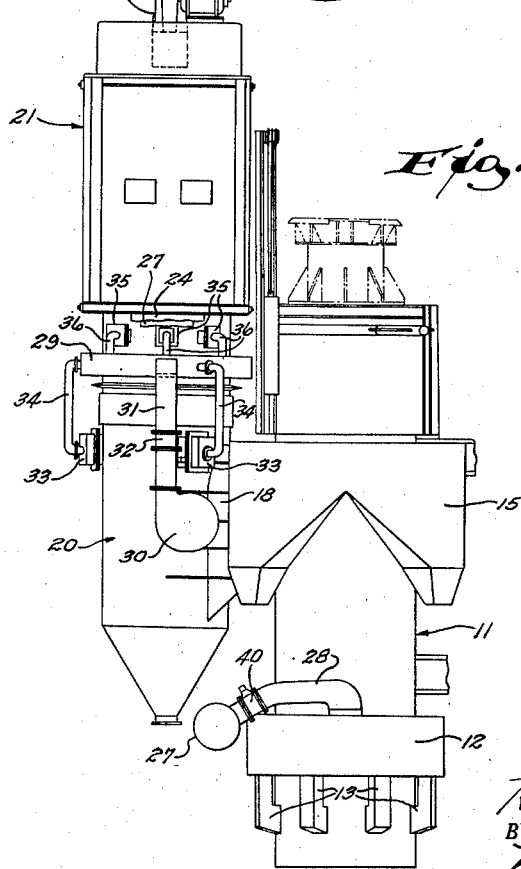
INVENTOR.
Harold W. Schwengel
BY
Morsell & Morsell
ATTORNEYS.

United States Patent Office 2,817,508
Patented Dec. 24, 1957

2,817,508

APPARATUS FOR MELTING IRON IN A CUPOLA

Harold W. Schwengel, Port Washington, Wis., assignor to Modern Equipment Company, Port Washington, Wis., a corporation of Wisconsin Application April 1, 1952, Serial No. 279,878

1 Claim. (Cl. 266—30)

This invention relates to improvements in the apparatus for melting iron in a cupola.

It has been standard practice for many years to melt iron for castings in an open or unsealed type of cupola. This type of cupola usually has an open top, and the gases of combustion pass out through this top opening. In this type of cupola there is a tremendous loss of heat, not only because of the high temperature of the gases discharged into the atmosphere, but also because of the fact that these gases contain substantial quantities of burnable gases, such as carbon monoxide. In addition, the iron produced in an open type cupola is not as uniform as desired, due to the fact that the temperatures within open cupolas cannot be accurately controlled.

With the above in mind, it is a general object of the present invention to provide an improved method of melting iron in a cupola, which method provides accurate control of the temperature within the cupola, thereby providing accurate control of the quality of the iron produced.

A further, more specific object of the invention is to provide an improved method of melting iron in a cupola which includes the steps of sealing the cupola from the circumambient atmosphere during operation, and supplying accurately controlled amounts of air to the cupola at a predetermined temperature, as well as withdrawing the gases of combustion from the cupola at a predetermined rate to thereby create uniform pressure and temperature conditions within the cupola.

A further object of the invention is to provide an improved method of and apparatus for melting iron in a cupola which method results in substantially increased efficiency by reason of the utilization of the normally wasted gases of combustion for preheating the fresh air entering the bottom of the cupola.

A further more specific object of the invention is to provide an improved method of and apparatus for melting iron in a cupola wherein the gases of combustion are withdrawn from the cupola and mixed with combustion supporting fresh air in an auxiliary combustion chamber, the heat of the burned mixture being used to preheat the fresh air entering the bottom of the sealed cupola.

A further object of the invention is to provide an improved cupola and associated apparatus wherein the amount of fresh air supplied to the cupola can be accurately controlled so that a fire bed of uniform heat is produced during the burn-in period with reduced burn-in time required.

A further object of the invention is to provide an improved cupola structure and associated apparatus which is capable of supplying the cupola with a hot blast of fresh air from the start of the melting operation, thus eliminating slag bridges, tuyere stoppages and uneven tuyere contours, which conditions frequently arise in conventional cupolas as a result of the use of cold fresh air blasts which chill the slag and solidify it at the tuyeres.

A further object of the invention is to provide an improved apparatus for melting iron in a sealed cupola which apparatus permits operation of the cupola under any selected pressure condition such as a negative pressure condition, a positive condition, or an atmospheric pressure condition.

A further specific object of the invention is to provide an improved method of and apparatus for melting iron in a cupola wherein the temperature of the preheated fresh air entering the bottom of the cupola is maintained at a predetermined level by varying the amount of fresh air which is mixed with the gases of combustion inversely as the temperature of the preheated air entering the bottom of the cupola increases or decreases from said predetermined temperature.

With the above and other objects in view, the invention consists of the improved method of and apparatus for melting iron in a cupola, and all of the steps, parts and combinations incident thereto, as set forth in the claims, and all equivalents thereof.

In the drawings accompanying and forming a part of this specification, wherein one complete embodiment of the preferred form of the invention is shown, and wherein like characters of reference indicate the same parts in all of the views:

Fig. 2 is an enlarged horizontal sectional view taken approximately along the line 2—2 of Fig. 1; and Fig. 3 is a fragmentary side elevational view on a reduced scale taken approximately along the line 3—3 of Fig. 1.

Figure 1:
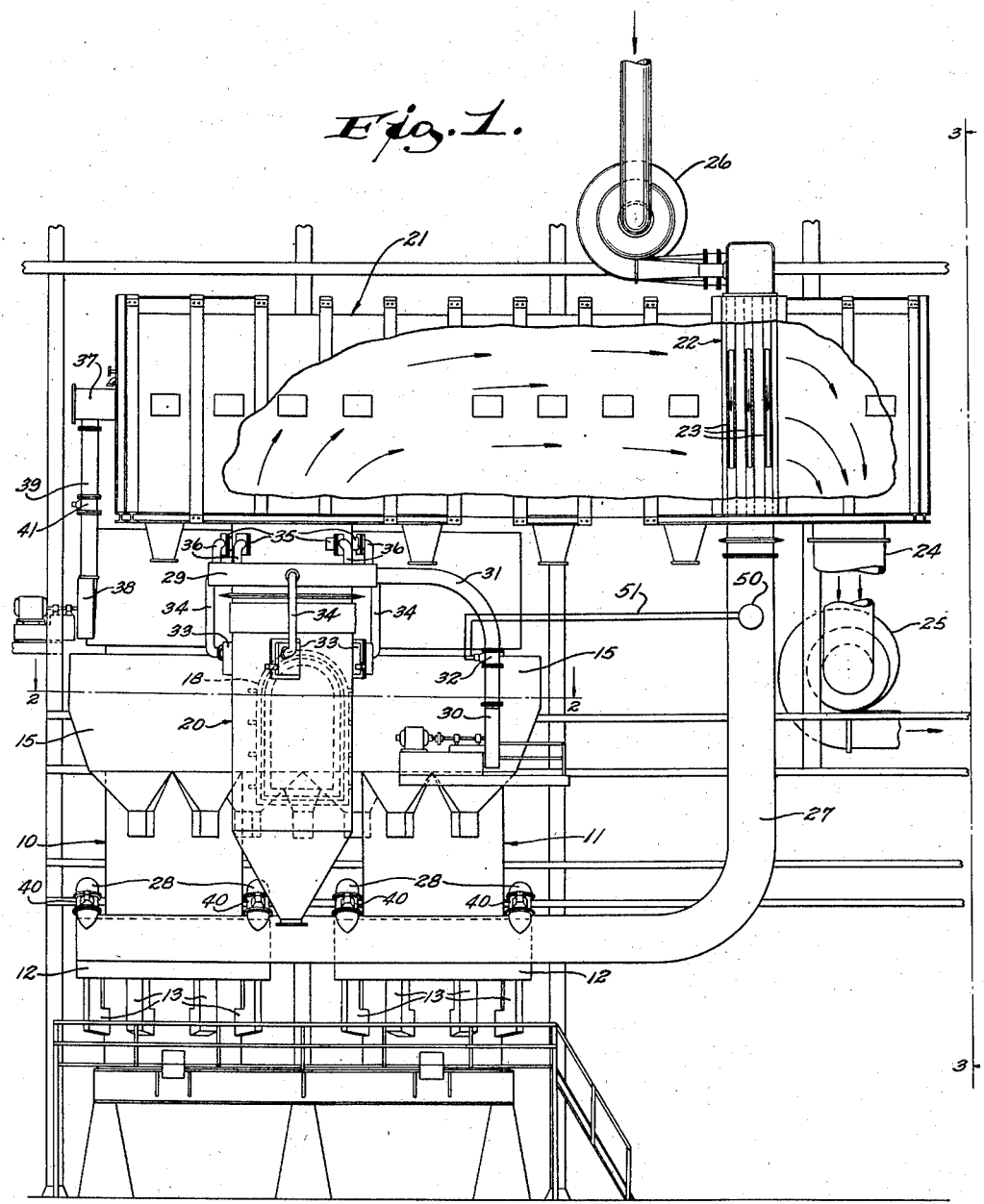
Fig. 1 is a front elevational view showing the improved apparatus associated with a pair of cupolas, parts being broken away.

Referring more particularly to the drawings, numerals 10 and 11 indicate a pair of cupolas mounted in side-by-side relationship. Each of said cupolas is surrounded near its lower end by an annular manifold or wind box 12. Projecting downwardly from the wind boxes 12 are a plurality of L-shaped ducts 13 which afford communication between the wind boxes 12 and the lower end of the interior of the cupola in accordance with standard practice. Referring to Fig. 2, each of the cupolas 10 and 11 is formed with a plurality of ports 14 extending radially through the walls above the firebed level. Outwardly of the ports 14 the cupolas 10 and 11 are surrounded by annular manifolds or bustle pipes 15 which may have their lower portions formed in the shape of hoppers as shown.

The bustle pipes 15 are connected as shown in Fig. 2 and are each formed with an opening 16 having a damper 17 which is preferably water cooled. A transversely extending duct 18 communicates with the openings 16 of both of the cupolas 10 and 11, as shown in Fig. 2, said duct being provided with a rotatably mounted damper 19, preferably water cooled. The bottom portion of the duct 18 may be shaped in the form of a hopper, as shown in Fig. 2.

The outer end of the duct 18 is connected to and communicates with an elongated, vertically extending cylinder or chamber 20. The lower end of the cylinder 20 may be in the form of a hopper as shown, and its upper end may be connected to the underside of an elongated horizontally extending box-like chamber 21 near one end of said chamber. The chamber 21, together with the cylinder 20 form an L-shaped auxiliary combustion chamber. Mounted across the interior of the chamber 21 is a heat exchanger 22 which may include a plurality of spaced, vertical pipes 23. The heat exchanger 22 is spaced away from but nevertheless relatively near that end of the chamber 21 which is away from the cylinder 20, there being an outlet connection 24 in the bottom wall of the chamber 21 between the heat exchanger 22 and the adjacent end of said chamber. The exhaust connection 24 is connected to the inlet of the power driven variable speed blower 25 for exhausting gases of combustion from the chamber 21. Suitable dust collecting and/or exhaust gas washing equipment (not shown) may be interposed between the outlet connection 24 and blower 25, if desired.

A power driven variable speed primary blower 26 is mounted above the combustion chamber 21 and has its outlet communicating with the upper ends of the pipes 23 of the heat exchanger 22. An L-shaped conduit or duct 27 communicates at one end with the lower ends of the pipes 23 of the heat exchanger 22. Adjacent its opposite end, the duct 27 is provided with four branch pipes 28 which lead into the wind boxes 12, as shown in Figs. 1 and 3. The conduits 28 may each include a valve 40, as shown.

An annular manifold 29 surrounds the upper portion of the cylinder 20. A variable speed power driven blower 30 is connected to said manifold by a pipe or conduit 31, said conduit having a combustion control valve 32 therein. Mounted on the cylinder 20 below the manifold 29 are equally spaced air inlet and pilot burner connections 33, preferably three in number, which are disposed in tangential relationship with the cylinder 20. The connections 33 communicate with the manifold 29 through U-shaped pipes 34. Spaced above the manifold 29 are a plurality of secondary air inlet connections 35 which are also mounted on the cylinder 20 in tangential relationship therewith. A plurality of pipes 36 afford communication between the manifold 29 and the connections 35.

As shown in Fig. 1, that end wall of the chamber 21 which is adjacent the cylinder 20 may be provided with an air inlet and pilot burner assembly 37. The assembly 37 may be supplied with fresh air from a variable speed power driven blower 38 through a pipe 39, the latter having a combustion control valve 41 therein.

The cupolas 10 and 11 are of the sealed type shown and described in my copending application for patent relating to Improvements in Cupolas and Charging Apparatus Therefor, Serial No. 279,877, filed April 1, 1952, now Patent No. 2,704,610, granted March 22, 1955, and therefore will not be described in detail herein. This type of cupola is at all times sealed from the circumambient atmosphere and is provided at its upper end with a charging opening (not shown), having a door (also not shown) for sealingly closing said opening. The copending application referred to shows and describes apparatus for charging this type of cupola without impairing the sealed condition thereof. In dot and dash lines in Fig. 3 of the drawings of the present application, a covered charging bucket is shown in charging position on the cupola 11.

The cupolas 10 and 11 are preferably operated alternately, one being operated one day, and the other the next. As shown in Fig. 2, the damper 17 of the cupola 11 is open as is the damper 19, thereby providing communication between the cupola 11 and the cylinder 20. The damper 17 of the cupola 10 is closed to isolate said cupola. When the dampers 17 and 19 are thus arranged to provide for operation of the cupola 11, the valves 40 in the conduits 28 which lead to the manifold of the cupola 11 are opened, and the valves 40 in the conduits 28 which lead to the manifold of the cupola 10 are closed.

During operation of the cupola 11 the gases of combustion from the firebed travel out of the bustle ports 14 into the bustle 15, through the opening 16, duct 18, and into the cylinder 20. As shown in Fig. 2, the duct 18 is positioned slightly off center with respect to the cylinder 20 to impart a tangential or whirling action to the gases as they enter the cylinder 20 and travel upwardly therein. This whirling action causes the heavier gas entrained particles, such as cinders, to drop into the hopper bottom of the cylinder 20. The gases of combustion which leave the cupola contain a substantial portion of burnable components such as carbon monoxide.

The blower 30 supplies fresh air under pressure to the manifold 29, and in turn, to the fresh air inlet connections 33 and 35. As fresh air from the inlet connections 33 is mixed with the hot burnable gases of combustion travelling upwardly in the cylinder 20, said burnable gases are ignited by the pilot burners in the connections 33 if said gases are not already at ignition temperature. Sufficient fresh air to permit substantially complete combustion of the burnable gases is normally supplied to the cylinder 20 through the inlet connections 35, and the burning gases travel upwardly into and through the horizontal chamber 21 as indicated by the arrows in Fig. 1. The ignition of the burnable portions of the cupola gases raises their temperature substantially, and complete combustion of said gases is normally accomplished within the chamber 21.

The hot gases travel toward the opposite end of the chamber 21 and pass through the heat exchanger 22 where a substantial portion of the heat contained in the gases is absorbed. The gases leave the chamber 21 through the connection 24, being drawn out by the exhaust blower 25. As pointed out previously, the gases may, if desired, by passed through any suitable dust collecting and/or washing equipment after leaving the chamber 21 and prior to discharge.

Relatively cool fresh air enters the pipes 23 from the blower 26, and as the air travels downwardly through said pipes it is heated to a predetermined temperature by the heat which has been absorbed from the hot gases in the chamber 21. The pressure of the blower 26 forces the heated fresh air downwardly through the conduit 27 and through the branch pipes 28 leading to the manifold 12 of the cupola 11. This preheated air then travels into the bottom of the cupola 11 through the inlet conduits 13 thereof.

The combustion control valve 32 regulates the amount of fresh air which is blown into the cylinder 20 for mixture with the burnable gases. As long as the blowers 25 and 26 are operated at uniform speeds, substantially uniform pressure conditions will be maintained within the cupola 11. To maintain uniform temperature conditions within the cupola, however, it is necessary that the temperature of the preheated air entering the bottom of the cupola be kept substantially constant. To attain this end, whenever the temperature of the preheated air in the duct 27 deviates substantially from the predetermined desired temperature therefore, the combustion control valve 32 is adjusted to vary the amount of fresh air entering the cylinder 20 inversely as the temperature of the preheated air increases or decreases with respect to said predetermined temperature. For example, if the temperature of the preheated air rises above the desired figure for efficient operation, then the valve 32 is adjusted to cut down the amount of air entering the cylinder 20, thus decreasing the degree of combustion of the burnable components of the cupola gases, and thereby lowering the temperature within the chamber 21, as well as well as lowering the rate of heat transfer from the hot gases to the fresh air in the pipes 23. The lowering of the rate of heat transfer lowers the temperature of the preheated air to the predetermined point.

While the above object may be accomplished manually through manual regulation of the valve 32, it may also be accomplished automatically. When this is done, a suitable device 50, which is responsive to the temperature of the preheated air, may be employed in the pipe 27. This may be suitably connected as by electric wires or other connection 51 with mechanism in the valve 32, of any well-known type, which will cause greater or lesser opening of the valve 32 in accordance with the temperature in the conduit 27. In this case the valve 32 may be any well-known type of motor actuated valve.

When desired, fresh air may be introduced into the chamber 21 through the connection 37, either in place of or in conjunction with the introduction of fresh air through the connections 33 and 36. The amount of air introduced through the connection 37 can be accurately controlled by means of the combustion control valve 41. It is obvious that the amount of fresh air entering the cylinder 20 through the connections 33 and 35 can also be varied by varying the speed of the blower 30, and the amount of air entering the chamber 21 through the connection 37 can be varied by varying the speed of the blower 38.

By maintaining uniform temperature conditions within the cupola in the manner described, a heretofore unobtainable uniformly high quality of product results. In addition, the ignition of burnable components of the cupola gases, which are normally discharged as waste, and the utilization of the heat of said cupola gases after ignition for the purpose of preheating the fresh air entering the bottom of the cupola, results in highly efficient operation. It also makes possible the accurate control of the temperature within the cupola by the simple expedient of controlling the extent of the ignition of the burnable portions of the cupola gases.

The improved apparatus permits operation of the cupola under any selected pressure condition. Due to the sealed nature of the cupola, all of the gases of combustion from the upper portion of the cupola are withdrawn through the auxiliary combustion chamber and through the heat exchanger.

Various changes and modifications may be made without departing from the spirit of the invention, and all of such changes are contemplated, as may come within the scope of the claim.

What I claim as the invention is:

In combination, a sealed cupola having a fresh air inlet in a bottom portion thereof and having an outlet for gases of combustion in an upper portion, an auxiliary combustion chamber communicating with said cupola outlet to receive gases of combustion therefrom, fresh air introducing means connected to said auxiliary combustion chamber for introducing fresh air into said chamber to support combustion of gases therein, a heat exchanger in said auxiliary combustion chamber having fresh air passages, a conduit connecting said fresh air passages with the fresh air inlet in the bottom of the cupola, a temperature responsive device in said conduit responsive to the temperature of the air therein, means controlling the amount of air introduced by said fresh air introducing means to said auxiliary combustion chamber, operative connections between said means and the temperature responsive device whereby the amount of fresh air introduced into said auxiliary combustion chamber is automatically controlled by the temperature of the air in the conduit leading to the fresh air inlet connection at the bottom of the cupola, means for causing movement of fresh air through said heat exchanger passages and into the bottom of the cupola, and means for causing withdrawal of gases from the cupola outlet and auxiliary combustion chamber through said heat exchanger.

References Cited in the file of this patent

UNITED STATES PATENTS

| | | |
|---|---|---|
| 1,262,841 | Randolph | Apr. 16, 1918 |
| 1,872,569 | Boegehold | Aug. 16, 1932 |
| 2,078,747 | Vial | Apr. 27, 1937 |
| 2,499,358 | Cooper et al. | Mar. 7, 1950 |
| 2,570,859 | Rasmussen | Oct. 9, 1951 |
| 2,625,386 | Leone | Jan. 13, 1953 |

OTHER REFERENCES

The Pressurized Cupola, The Foundry, September 1950.

Foundry Trade Journal, November 24, 1949.

Develops Pressurized Cupola, Foundry, February 1952.